(12) United States Patent
Guang et al.

(10) Patent No.: US 11,966,296 B2
(45) Date of Patent: Apr. 23, 2024

(54) MASTER-SLAVE ARCHITECTURE DEPLOYMENT METHOD AND DEVICE BASED ON SNAPSHOT

(71) Applicant: SHANGHAI SUNINFO INFORMATION TECHNOLOGY CO., LTD., Shanghai (CN)

(72) Inventors: Zhilong Guang, Shanghai (CN); Fei Chen, Shanghai (CN); Qing Du, Shanghai (CN)

(73) Assignee: SHANGHAI SUNINFO INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/140,623

(22) Filed: Apr. 28, 2023

(65) Prior Publication Data

US 2023/0267048 A1     Aug. 24, 2023

Related U.S. Application Data

(63) Continuation of application No. PCT/CN2020/138916, filed on Dec. 24, 2020.

(30) Foreign Application Priority Data

Nov. 27, 2020   (CN) .......................... 202011359858.9

(51) Int. Cl.
  *G06F 11/00* (2006.01)
  *G06F 11/14* (2006.01)
  *G06F 16/2457* (2019.01)

(52) U.S. Cl.
  CPC .... *G06F 11/1446* (2013.01); *G06F 16/24575* (2019.01); *G06F 2201/80* (2013.01); *G06F 2201/84* (2013.01)

(58) Field of Classification Search
  CPC .................................................. G06F 11/1446
  See application file for complete search history.

(56) References Cited

U.S. PATENT DOCUMENTS

| | | | |
|---|---|---|---|
| 10,372,329 B1* | 8/2019 | Ahrens | ................. G06F 3/0665 |
| 2005/0027749 A1* | 2/2005 | Ohno | ................. G06F 11/1471 |

(Continued)

FOREIGN PATENT DOCUMENTS

| | | |
|---|---|---|
| CN | 104657382 A | 5/2015 |
| CN | 104679614 A | 6/2015 |

(Continued)

*Primary Examiner* — Joshua P Lottich
(74) *Attorney, Agent, or Firm* — Bayramoglu Law Offices LLC

(57) ABSTRACT

A master-slave architecture deployment method based on snapshot includes: restoring a core library corresponding to a MySQL database at any point in snapshot time, where the core library is a virtual library of the MySQL database; querying out at least one piece of configuration information necessary for master-slave configuration of the MySQL database by using the core library as baseline; taking a snapshot on the core library by using a snapshot technology; creating and cloning at least one copy library corresponding to the core library respectively based on the snapshot and the at least one piece of configuration information necessary for master-slave configuration; and configuring a master-slave relationship and a master library and a slave library corresponding to the master-slave relationship for the core library and the at least one copy library. A master-slave architecture deployment device based on snapshot is further provided.

14 Claims, 2 Drawing Sheets

(56) References Cited

U.S. PATENT DOCUMENTS

| | | | | |
|---|---|---|---|---|
| 2010/0077160 | A1* | 3/2010 | Liu | G06F 12/16 |
| | | | | 711/E12.103 |
| 2012/0124203 | A1* | 5/2012 | Richards | H04N 21/4516 |
| | | | | 709/224 |
| 2016/0224259 | A1* | 8/2016 | Ahrens | G06F 3/067 |
| 2017/0206017 | A1* | 7/2017 | Sun | G06F 3/067 |
| 2018/0300203 | A1 | 10/2018 | Netpp et al. | |
| 2019/0272222 | A1 | 9/2019 | Wei et al. | |

FOREIGN PATENT DOCUMENTS

| | | | |
|---|---|---|---|
| CN | 105955989 | A | 9/2016 |
| CN | 110019527 | A | 7/2019 |
| CN | 111125060 | A | 5/2020 |

* cited by examiner

MASTER-SLAVE ARCHITECTURE DEPLOYMENT METHOD AND DEVICE BASED ON SNAPSHOT

CROSS REFERENCE TO THE RELATED APPLICATIONS

This application is the continuation application of International Application No. PCT/CN2020/138916, filed on Dec. 24, 2020, which is based upon and claims priority to Chinese Patent Application No. 202011359858.9, filed on Nov. 27, 2020, the entire contents of which are incorporated herein by reference.

TECHNICAL FIELD

The present application relates to the field of computers, and in particular to a master-slave architecture deployment method and device based on snapshot.

BACKGROUND

Currently, there are two solutions to ensure data consistency in an initial state for database master-slave deployment: respectively are directly copying a MySQL data directory, and exporting and then importing through mysql dump. The manner of directly copying the MySQL data directory can ensure the data consistency during master-slave relationship configuration, but the integrity of the copied data needs to be ensured; otherwise, there will be a problem in database instance starting, and in the case of a large amount of data, the required time cost is very great. The manner of exporting and then importing through mysql dump can ensure the data consistency during master-slave relationship configuration, but the operation is very complicated, a problem is likely to occur during manual operation, and in the case of a large amount of data, the required time cost is very great.

SUMMARY

One objective of the present application is to provide a master-slave architecture deployment method and device based on snapshot. The complexity of the master-slave architecture deployment of a MySQL database is reduced, a scheme of automatic master-slave architecture deployment of the MySQL database is realized, and the time cost of the master-slave architecture deployment is saved.

According to one aspect of the present application, a master-slave architecture deployment method based on snapshot is provided, and the method includes:
   restoring a core library corresponding to a MySQL database at any point in snapshot time, the core library is a virtual library of the MySQL database;
   querying out at least one piece of configuration information necessary for master-slave configuration of the MySQL database by using the core library as baseline;
   taking a snapshot on the core library by using a snapshot technology;
   creating and cloning at least one copy library corresponding to the core library respectively based on the snapshot and the at least one piece of configuration information necessary for master-slave configuration; and
   configuring a master-slave relationship and a master library and a slave library corresponding to the master-slave relationship for the core library and the at least one copy library.

Further, in the method, the configuring a master-slave relationship and a master library and a slave library corresponding to the master-slave relationship for the core library and the at least one copy library includes:
   obtaining a configuration requirement of a user on the master-slave architecture deployment of the MySQL database; and
   configuring the master-slave relationship and the master library and the slave library corresponding to the master-slave relationship for the core library and the at least one copy library based on the configuration requirement.

Further, in the method, the configuring the master-slave relationship and the master library and the slave library corresponding to the master-slave relationship for the core library and the at least one copy library based on the configuration requirement includes:
   starting a database instance of the copy library, and configuring a configuration master-slave relationship between the core library and each library of the at least one copy library and the master library and the slave library corresponding to the master-slave relationship based on the configuration requirement.

Further, in the method, the master-slave relationship includes at least any one of the followings:
   a master library and at least one slave library corresponding to the master library;
   at least one master library;
   at least one master library and at least one slave library corresponding to each master library; and
   a master library, at least one slave library corresponding to the master library, and one or more sub slave libraries corresponding to each slave library.

According to another aspect of the present application, a non-volatile storage medium is further provided, which stores a computer-readable instruction, and when the computer-readable instruction is able to be executed by a processor, the processor is enabled to implement the master-slave architecture deployment method based on snapshot as described above.

According to another aspect of the present application, a master-slave architecture deployment device based on snapshot is further provided, and the device includes:
   one or more processors; and
   a computer-readable medium, configured to store one or more computer-readable instructions,
   when the one or more computer-readable instructions are executed by the one or more processors, the one or more processors are enabled to implement the master-slave architecture deployment method based on snapshot as described above.

Compared with the prior art, in the present application, by restoring the core library corresponding to the MySQL database at any point in snapshot time, the core library is the virtual library of the MySQL database; querying out the at least one piece of configuration information necessary for master-slave configuration of the MySQL database by using the core library as baseline; taking the snapshot on the core library by using the snapshot technology; creating and cloning the at least one copy library corresponding to the core library respectively based on the snapshot and the at least one piece of configuration information necessary for master-slave configuration; and configuring the master-slave relationship and the master library and the slave library corresponding to the master-slave relationship for the core library and the at least one copy library, a scheme of automatic master-slave architecture deployment of the MySQL database is realized, the complexity of the master-slave architecture deployment of the MySQL database is reduced, and the time cost of the master-slave architecture deployment is also saved.

BRIEF DESCRIPTION OF THE DRAWINGS

Other features, objectives and advantages of the present application will become more apparent upon reading the detailed description of non-limiting embodiments made with reference to the following accompanying drawings.

The same or like reference numbers in the drawings refer to the same or like parts.

DETAILED DESCRIPTION OF THE EMBODIMENTS

Figure 1:
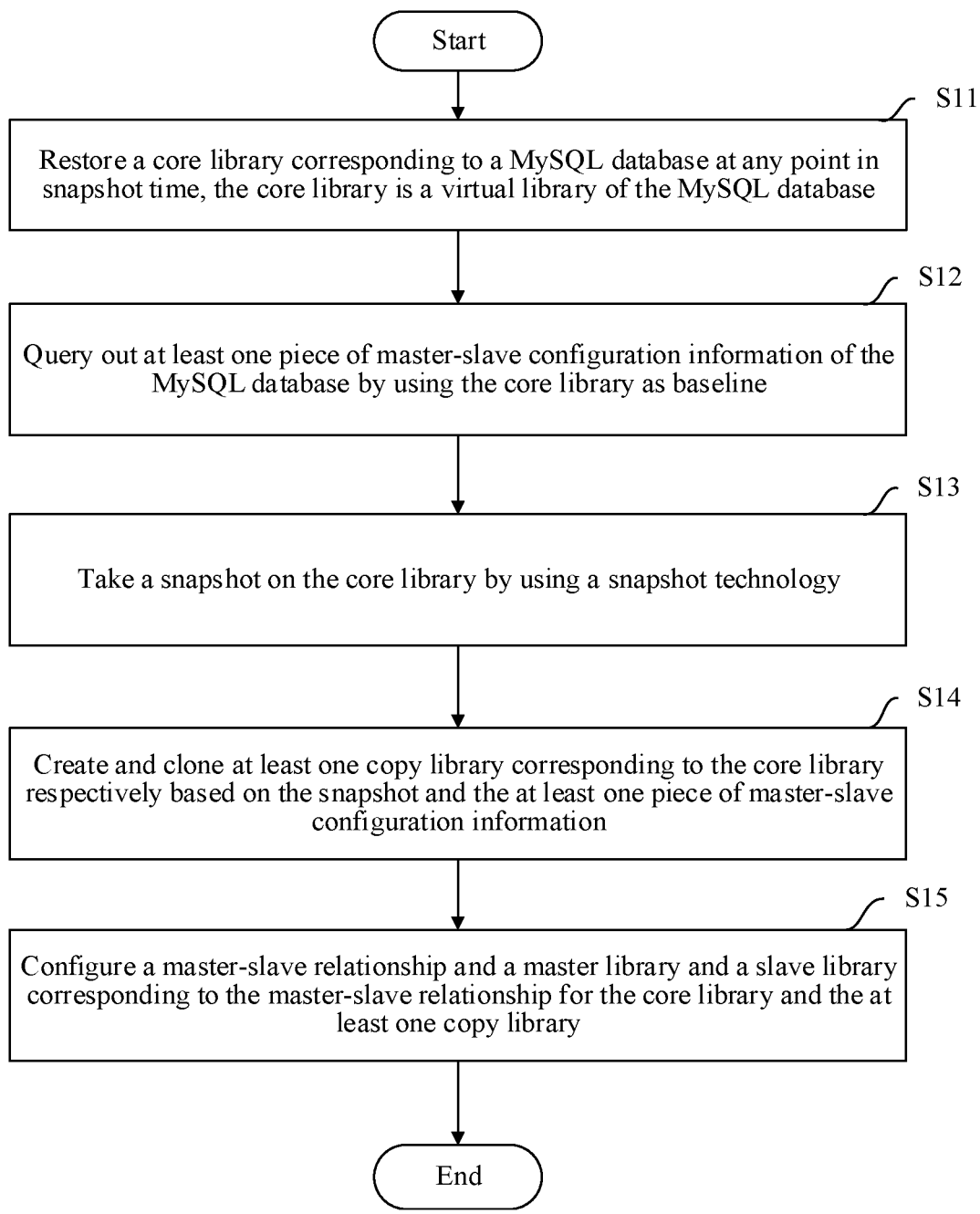
FIG. 1 shows a schematic flow diagram of a master-slave architecture deployment method based on snapshot according to one aspect of the present application.
Figure 2:
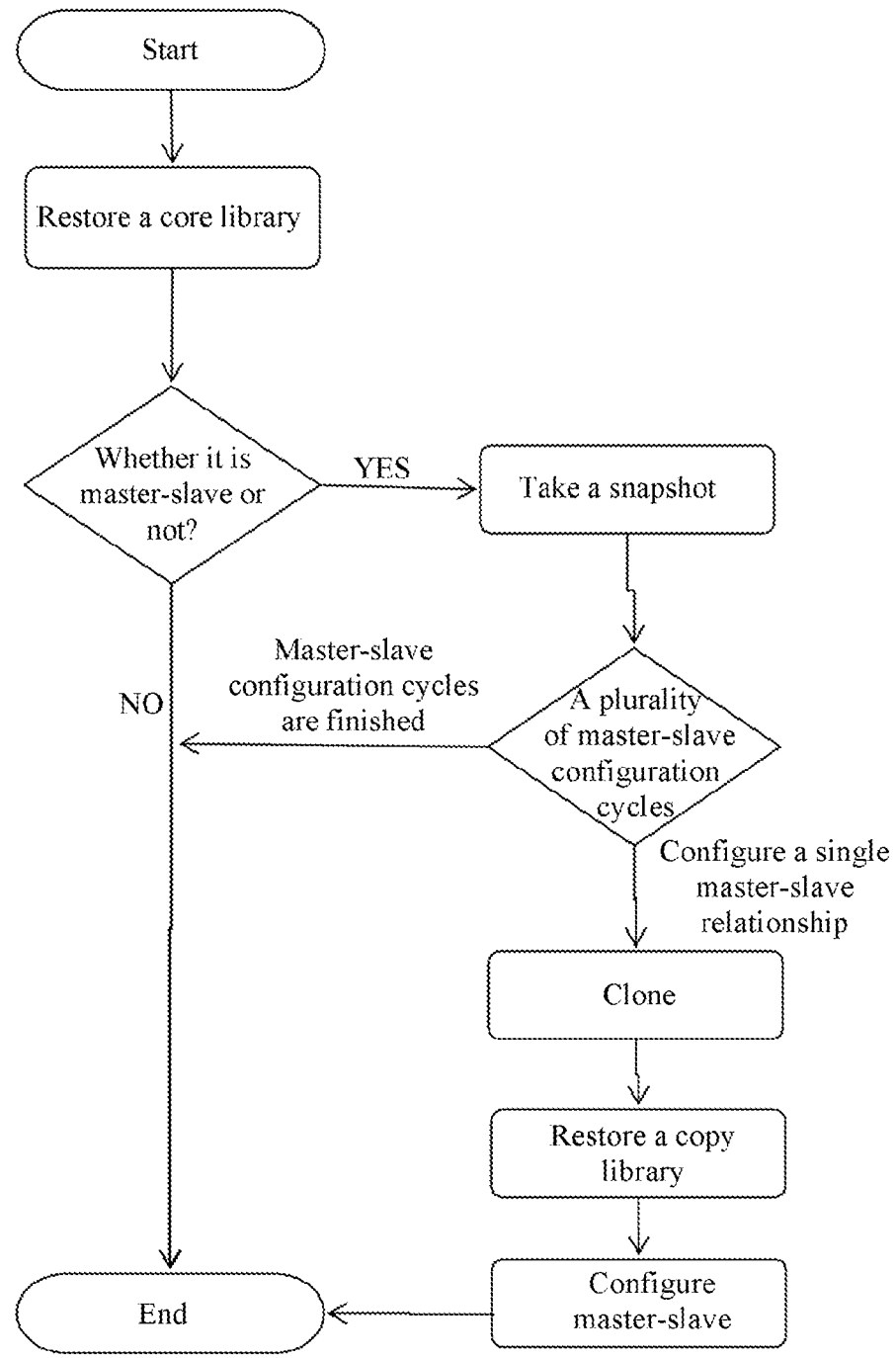
FIG. 2 shows a schematic diagram of a practical application scenario of a master-slave architecture deployment method based on snapshot according to one aspect of the present application.

The present application will be further described in detail hereafter with reference to the accompanying drawings.

In a typical configuration of the present application, each of a terminal, a device of a serving network and a trusted party includes one or more processors (CPU), an input/output interface, a network interface and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer includes, but is not limited to, a phase-change memory (PRAM), a static random access memory (SRAM), a dynamic random access memory (DRAM), or other types of random access memory (RAM), a read-only memory (ROM), an electrically erasable programmable read-only memory (EEPROM), a flash memory or another storage technology, a compact disc read-only memory (CD-ROM), a digital versatile disc (DVD) or another optical storage, a cartridge tape, a magnetic tape, a magnetic disk storage or another magnetic storage device, or any other non-transmission medium, which may be configured to store information accessible by a computing device.

According to a schematic flow diagram of a master-slave architecture deployment method based on snapshot according to one aspect of the present application, the method includes: step S11, step S12, step S13, step S14 and step S15. The method specifically includes the following steps:

Step S11: a core library corresponding to a MySQL database is restored at any point in snapshot time, the core library is a virtual library of the MySQL database.

Step S12: at least one piece of configuration information necessary for master-slave configuration of the MySQL database is queried out by using the core library as baseline. The configuration information necessary for master-slave configuration is used for indicating necessary information required for the MySQL master-slave configuration, and the configuration information includes but is not limited to a current binlog name, a binlog location point and the like of the core library.

Step S13: a snapshot is taken on the core library by using a snapshot technology.

Step S14: at least one copy library corresponding to the core library is created and cloned respectively based on the snapshot and the at least one piece of configuration information necessary for master-slave configuration.

Step S15: a master-slave relationship and a master library and a slave library corresponding to the master-slave relationship are configured for the core library and the at least one copy library. Herein, the master-slave relationship includes at least any one of the followings: a master library and at least one slave library corresponding to the master library; at least one master library; at least one master library and at least one slave library corresponding to each master library; and a master library, at least one slave library corresponding to the master library, and one or more sub slave libraries corresponding to each slave library. For example, the master-slave architecture deployment relationships such as one master library and three slave libraries; two master libraries; two master libraries, one master library corresponds to two slave libraries and the other master library corresponds to three slave libraries; one master library corresponds to one slave library and the slave library corresponds to one or more sub slave libraries may be used.

Through the above step S11 to step S15, by managing the data backup snapshots on the MySQL database, a core library can be quickly restored for data of the MySQL database at any point in snapshot time, the information necessary for master-slave configuration is queried out by using the core library as baseline, a snapshot is taken on the core library by using the snapshot technology, at least one copy library corresponding to the core library is created and cloned respectively based on the snapshot and the at least one piece of configuration information necessary for master-slave configuration, and the master-slave relationship and the master library and the slave library corresponding to the master-slave relationship are configured for the core library and the at least one copy library, so that a scheme of minute-level configuration of complicated MySQL master-slave architecture deployment is realized, the complexity of the master-slave architecture deployment of the MySQL database is reduced, and the time cost of the master-slave architecture deployment is also saved.

Further, the step S15 that a master-slave relationship and a master library and a slave library corresponding to the master-slave relationship are configured for the core library and the at least one copy library includes: a configuration requirement of a user on the master-slave architecture deployment of the MySQL database is obtained; and the master-slave relationship and the master library and the slave library corresponding to the master-slave relationship are configured for the core library and the at least one copy library based on the configuration requirement. For example, the user sets a configuration input operation requiring database master-slave architecture deployment in a corresponding display interface of the database, and the configuration requirement of the user on the master-slave architecture deployment of the MySQL database is obtained. Based on the configuration requirement, the master-slave relationship and the master library and the slave library corresponding to the master-slave relationship are configured for the core library and the at least one copy library, and a scheme of automatic master-slave architecture deployment of the MySQL database is realized.

Further, the step S15 that the master-slave relationship and the master library and the slave library corresponding to the master-slave relationship are configured for the core library and the at least one copy library based on the configuration requirement includes:

a database instance of the copy library is started, and a configuration master-slave relationship between the core library and each library of the at least one copy library and the master library and the slave library corresponding to the master-slave relationship are configured based on the configuration requirement. Herein, the configuration requirement is used for showing specific requirements of the user to set the master-slave architecture, so that different master-slave relationship configurations can be subsequently performed on the core library and the copy library according to the configuration requirement.

For example, if the configuration requirement is one master library and three slave libraries corresponding to the master library, in step S15, the database instance of the copy library is started, and the master-slave relationship between the core library and each library of the three copy libraries is configured according to the configuration requirement. For example, for a core library 1, a copy library 1, a copy library 2 and a copy library 3, the copy library 1 is used as the master library, the copy library 2, the copy library 3 and the core library 1 are all slave libraries of the copy library 1, so as to realize the master-slave relationship determination and configuration on the core library and the at least one copy library. For another example, for the core library 1, the copy library 1, the copy library 2 and the copy library 3, the copy library 2 is used as the master library, the copy library 1 and the core library 1 are both slave libraries of the copy library 2, and the copy library 3 is a sub slave library of the slave library: the copy library 2, which also realize the master-slave relationship determination and configuration on the core library and the at least one copy library. For another example, for the core library 1, the copy library 1, the copy library 2 and the copy library 3, the core library 1 and the copy library 1 are respectively used as master libraries, the copy library 2 is the slave library of the core library 1, and the copy library 3 is the slave library of the copy library 1, so as to realize the master-slave relationship determination and configuration on the core library and the at least one copy library, and the goal of quickly configuring the architecture deployment of one master and a plurality of slaves, double masters, double masters and a plurality slaves, mater-slave-slave and the like corresponding to the MySQL database according to the configuration requirement set by the user is achieved, and great time cost is saved.

According to another aspect of the present application, a non-volatile storage medium is further provided, which stores a computer-readable instruction, and when the computer-readable instruction is able to be executed by a processor, the processor is enabled to implement the master-slave architecture deployment method based on snapshot as described above.

According to another aspect of the present application, a master-slave architecture deployment device based on snapshot is further provided, and the device includes:
one or more processors; and
a computer-readable medium, configured to store one or more computer-readable instructions,
when the one or more computer-readable instructions are executed by the one or more processors, the one or more processors are enabled to implement the master-slave architecture deployment method based on snapshot as described above.

Herein, for detailed contents of each embodiment of the master-slave architecture deployment device based on snapshot, reference will be specifically made to corresponding parts of the embodiments of the master-slave architecture deployment method based on snapshot as mentioned above, which will not be repeated herein.

Based on the above, in the present application, by restoring the core library corresponding to the MySQL database at any point in snapshot time, the core library is the virtual library of the MySQL database; querying out the at least one piece of configuration information necessary for master-slave configuration of the MySQL database by using the core library as baseline; taking the snapshot on the core library by using the snapshot technology; creating and cloning the at least one copy library corresponding to the core library respectively based on the snapshot and the at least one piece of configuration information necessary for master-slave configuration; and configuring the master-slave relationship and the master library and the slave library corresponding to the master-slave relationship for the core library and the at least one copy library, a scheme of automatic master-slave architecture deployment of the MySQL database is realized, the complexity of the master-slave architecture deployment of the MySQL database is reduced, and the time cost of the master-slave architecture deployment is also saved.

It needs to be noted that the present application may be implemented in software and/or a combination of software and hardware, for example, it may be implemented by an application specific integrated circuit (ASIC), a general purpose computer, or any other similar hardware devices. In an embodiment, a software program of the present application may be executed through a processor to realize the steps or functions described above. Similarly, the software program (including a relevant data structure) of the present application may be stored in a computer-readable record medium, such as an RAM, a magnetic or optical driver or floppy disk or a similar device. Additionally, some steps or functions of the present application may be implemented by hardware, such as a circuit matched with the processor to execute each step or function.

Additionally, a part of the present application may be applied as a computer program product, such as a computer program instruction, which can invoke or provide methods and/or technical solutions in accordance with the present application through the operation of a computer when being executed by the computer. The program instructions invoking the method of the present application may be stored in a fixed or removable record medium, and/or transmitted over a data stream in a broadcast or other signal-bearing medium, and/or stored in a working memory of a computer device operating in accordance with the program instructions. Herein, an embodiment according to the present application includes an apparatus, the apparatus includes a memory configured to store computer program instructions and a processor configured to execute the program instructions. When the computer program instructions are executed by the processor, the apparatus is triggered to execute the method and/or the technical solution based on the plurality of embodiments of the present application.

For those skilled in the art, obviously, the present application is not limited to the details of the above illustrative embodiments, and the present application may be embodied in other specific forms without departing from the spirit or basic features of the present application. Therefore, in all aspects, the embodiments shall be considered as illustrative but not restrictive, the scope of the present application is indicated by the appended claims rather than the above description, and all changes falling within the meaning and scope of equivalence of the claims are therefore intended to be included in the present application. No reference numerals in the claims should be considered as limitations to the related claims. Furthermore, it will be understood that the word "include" does not exclude other units or steps, and the singular form does not exclude the plural form. A plurality of units or apparatuses in an apparatus claim may also be implemented by one unit or apparatus through software or hardware. The words such as "first" and "second" are only used for denoting names, and do not denote any particular order.

What is claimed is:

1. A master-slave architecture deployment method based on snapshot, comprising:
   restoring a core library corresponding to a MySQL database at any point in snapshot time, wherein the core library is a virtual library of the MySQL database;
   querying out at least one piece of configuration information necessary for master-slave configuration of the MySQL database by using the core library as baseline;
   taking a snapshot on the core library by using a snapshot technology;
   creating and cloning at least one copy library corresponding to the core library respectively based on the snapshot and the at least one piece of configuration information necessary for master-slave configuration; and
   configuring a master-slave relationship and a master library and a slave library corresponding to the master-slave relationship for the core library and the at least one copy library.

2. The master-slave architecture deployment method based on snapshot according to claim 1, wherein the step of configuring the master-slave relationship and the master library and the slave library corresponding to the master-slave relationship for the core library and the at least one copy library comprises:
   obtaining a configuration requirement of a user on a master-slave architecture deployment of the MySQL database; and
   configuring the master-slave relationship and the master library and the slave library corresponding to the master-slave relationship for the core library and the at least one copy library based on the configuration requirement.

3. The master-slave architecture deployment method based on snapshot according to claim 2, wherein the step of configuring the master-slave relationship and the master library and the slave library corresponding to the master-slave relationship for the core library and the at least one copy library based on the configuration requirement comprises:
   starting a database instance of the at least one copy library, and configuring a configuration master-slave relationship between the core library and each library of the at least one copy library and the master library and the slave library corresponding to the master-slave relationship based on the configuration requirement.

4. The master-slave architecture deployment method based on snapshot according to claim 3, wherein the master-slave relationship comprises at least any one of the following:
   a master library and at least one slave library corresponding to the master library;
   at least one master library;
   at least one master library and at least one slave library corresponding to each of the at least one master library; and
   a master library, at least one slave library corresponding to the master library, and one or more sub slave libraries corresponding to each of the at least one slave library.

5. The master-slave architecture deployment method based on snapshot according to claim 2, wherein the master-slave relationship comprises at least any one of the following:
   a master library and at least one slave library corresponding to the master library;
   at least one master library;
   at least one master library and at least one slave library corresponding to each of the at least one master library; and
   a master library, at least one slave library corresponding to the master library, and one or more sub slave libraries corresponding to each of the at least one slave library.

6. The master-slave architecture deployment method based on snapshot according to claim 1, wherein the master-slave relationship comprises at least any one of the following:
   a master library and at least one slave library corresponding to the master library;
   at least one master library;
   at least one master library and at least one slave library corresponding to each of the at least one master library; and
   a master library, at least one slave library corresponding to the master library, and one or more sub slave libraries corresponding to each of the at least one slave library.

7. A non-transitory storage medium, storing a computer-readable instruction, wherein when the computer-readable instruction is executed by a processor, the processor is enabled to implement the master-slave architecture deployment method based on snapshot according to claim 1.

8. The non-transitory storage medium according to claim 7, wherein in the master-slave architecture deployment method based on snapshot, the step of configuring the master-slave relationship and the master library and the slave library corresponding to the master-slave relationship for the core library and the at least one copy library comprises:
   obtaining a configuration requirement of a user on a master-slave architecture deployment of the MySQL database; and
   configuring the master-slave relationship and the master library and the slave library corresponding to the master-slave relationship for the core library and the at least one copy library based on the configuration requirement.

9. The non-transitory storage medium according to claim 8, wherein in the master-slave architecture deployment method based on snapshot, the step of configuring the master-slave relationship and the master library and the slave library corresponding to the master-slave relationship for the core library and the at least one copy library based on the configuration requirement comprises:
   starting a database instance of the at least one copy library, and configuring a configuration master-slave relationship between the core library and each library of the at least one copy library and the master library and the slave library corresponding to the master-slave relationship based on the configuration requirement.

10. The non-transitory storage medium according to claim 7, wherein in the master-slave architecture deployment method based on snapshot, the master-slave relationship comprises at least any one of the following:
   a master library and at least one slave library corresponding to the master library;
   at least one master library;
   at least one master library and at least one slave library corresponding to each of the at least one master library; and
   a master library, at least one slave library corresponding to the master library, and one or more sub slave libraries corresponding to each of the at least one slave library.

11. A master-slave architecture deployment device based on snapshot, comprising:
   one or more processors; and
   a computer-readable medium, configured to store one or more computer-readable instructions,
   wherein when the one or more computer-readable instructions are executed by the one or more processors, the one or more processors are enabled to implement the master-slave architecture deployment method based on snapshot according to claim 1.

12. The master-slave architecture deployment device based on snapshot according to claim 11, wherein in the master-slave architecture deployment method based on snapshot, the step of configuring the master-slave relationship and the master library and the slave library corresponding to the master-slave relationship for the core library and the at least one copy library comprises:
   obtaining a configuration requirement of a user on a master-slave architecture deployment of the MySQL database; and
   configuring the master-slave relationship and the master library and the slave library corresponding to the master-slave relationship for the core library and the at least one copy library based on the configuration requirement.

13. The master-slave architecture deployment device based on snapshot according to claim 12, wherein in the master-slave architecture deployment method based on snapshot, the step of configuring the master-slave relationship and the master library and the slave library corresponding to the master-slave relationship for the core library and the at least one copy library based on the configuration requirement comprises:
   starting a database instance of the at least one copy library, and configuring a configuration master-slave relationship between the core library and each library of the at least one copy library and the master library and the slave library corresponding to the master-slave relationship based on the configuration requirement.

14. The master-slave architecture deployment device based on snapshot according to claim 11, wherein in the master-slave architecture deployment method based on snapshot, the master-slave relationship comprises at least any one of the following:
   a master library and at least one slave library corresponding to the master library;
   at least one master library;
   at least one master library and at least one slave library corresponding to each of the at least one master library; and
   a master library, at least one slave library corresponding to the master library, and one or more sub slave libraries corresponding to each of the at least one slave library.

* * * * *